United States Patent [19]
Sugahara et al.

[11] 3,956,004
[45] May 11, 1976

[54] MANUFACTURE OF GRANULAR LEAD COMPOUNDS

[75] Inventors: Yujiro Sugahara, Tokyo; Yoshibumi Noshi, Tsuruoka; Hiroyuki Naito, Tsuruoka; Katsuya Toki, Tsuruoka, all of Japan

[73] Assignee: Mizusawa Kagaku Kogyo Kabushiki Kaisha, Osaka, Japan

[22] Filed: Feb. 27, 1973

[21] Appl. No.: 336,230

[30] Foreign Application Priority Data
Mar. 6, 1972    Japan............................ 47-22354
Nov. 22, 1972   Japan.......................... 47-116541

[52] U.S. Cl.................................. 106/297; 106/53
[51] Int. Cl.$^2$.................................... C04B 31/02
[58] Field of Search............. 106/297, 309; 423/619, 423/326

[56] References Cited
UNITED STATES PATENTS
2,268,913    1/1942    Turbett et al...................... 423/326
3,623,838    11/1971   Kunz et al.......................... 423/619

FOREIGN PATENTS OR APPLICATIONS
965,930    8/1964    United Kingdom................ 106/297
590,418    1/1960    Canada............................... 423/619
19,166     1/1970    Japan.................................. 423/619

Primary Examiner—Patrick P. Garvin
Assistant Examiner—J. V. Howard
Attorney, Agent, or Firm—Sherman & Shalloway

[57] ABSTRACT

This invention relates to a process for manufacturing granular lead oxides such as granular lead monoxide (litharge) and granular red lead at high purities from lead suboxide without formation of harmful dusts or fumes. Furthermore, the invention concerns novel lead bearing additives for use in ceramic industry, for instance, for formation of lead glasses and ceramic glazes to be employed for the manufacture of various optical glasses, cut glasses, tube lamp glasses, etc., and a process for the manufacture of such lead bearing additives.

9 Claims, 1 Drawing Figure

MANUFACTURE OF GRANULAR LEAD COMPOUNDS

This invention relates to a novel process for the manufacture of granular lead compounds, especially granular litharge, granular red lead and granular lead bearing additives for use in ceramic industry, and to novel granular lead bearing additives manufactured by the above process. More particularly, the invention relates to a process for manufacturing granular lead oxides such as granular lead monoxide (litharge) and granular red lead at high purities from lead suboxide without formation of harmful dusts or fumes. Furthermore, the invention concerns novel lead bearing additives for use in ceramic industry, for instance, for formation of lead glasses and ceramic glazes to be employed for the manufacture of various optical glasses, cut glasses, tube lamp glasses, etc., and a process for the manufacture of such lead bearing additives. More detailedly, the invention provides granular lead bearing additives for use in ceramic industry in which a lead oxide component and silicon dioxide are bonded to each other and are granulated in the novel phase system quite different from an ordinary continuous glass phase and by dint of this specific phase system generation of fume of lead oxide is extremely reduced as compared with red lead or litharge and is maintained at almost the same level as in the case of glassy lead silicate, and which are very excellent in uniformity of the interior composition; and a process for the manufacture of such granular lead bearing additives.

Lead monoxide has heretofore been prepared by methods including subjecting powdery lead suboxide to self-combustion in an oxygen-containing atmosphere. For instance, the specification of Japanese Patent Publication No. 11801/62 proposes a process for the preparation of lead monoxide which comprises charging powdery lead suboxide into a preheated rotary furnace, agitating it while introducing oxygen into the furnace, measuring the elevation of the temperature caused by combustion of lead monoxide, and withdrawing the combustion product when the combustion is terminated and a tendency of the temperature to decrease is observed.

This known method prepares lead monoxide by utilizing the heat generated by self-combustion of lead suboxide, but this method includes the following deficiencies.

Powder of lead suboxide has a flowability at the initial stage of combustion, but with advance of the reaction, the reaction mixture becomes viscous and it greatly tends to form agglomerates. Accordingly, when agitation is insufficient, an agglomerative reaction product is readily formed. In such agglomerative reaction product, though the surface portion consists of lead monoxide, in the interior portion reduction of lead suboxide is caused to occur by elevation of the temperature and therefore, the interior portion of such agglomerative reaction mixture is frequently composed of metallic lead. This defect that metallic lead is incorporated in the lead monoxide product has been overcome by oxidizing lead suboxide under agitation, but this procedure is still insufficient and unsatisfactory. More specifically, in this case, violent friction is caused to occur between the viscous reaction mixture and the wall of a reaction vessel or an agitating member, which results in incorporation of a material of the vessel wall or agitating member, such as iron, in the resulting lead monoxide, and reduction of the purity of the lead monoxide product cannot be obviated. Accordingly, lead monoxide prepared by such conventional method is insufficient and unsatisfactory when it is used in a field where impurity metal contents of the PPM order have great influences, for instance, it is used for formation of optical glasses.

Moreover, what is more serious in this conventional method is that great quantities of dusts of harmful lead oxides are formed when lead monoxide products are withdrawn outside from reaction vessels. It may be construed that scattering of such dusts into air will be prevented by employing dust precipitators or collectors. However, tremendous expenses are required for equipment of such dust precipitators or collectors, and dust recovery effects attained by them are not so high as will give satisfactory results.

Recently, there has been proposed a method using a sieving classifier and pneumatic grinder in combination. According to this method, lead monoxide is prepared by feeding powdery lead suboxide to the pneumatic grinder while blowing thereinto compressed air or oxygen together with steam, grinding, oxidizing and classifying the powdery lead suboxide by this stream of compressed air or oxygen, and separating the thus classified fine powder of lead monoxide from air or oxygen.

Indeed, this method is advantageous in that the pulverization of lead suboxide and the oxidization of lead suboxide to lead monoxide can be accomplished simultaneously. However, the separation of the resulting fine powder of lead monoxide from oxygen or air involves problems or difficulties. For instance, it is extremely difficult, though not impossible, to prevent dusts or lead oxide from being discharged into the outer air together with the discharge gas. Further, also in this method, since lead suboxide is pneumatically ground, particles of lead suboxide have inevitably a contact with the wall of the grinder, and therefore, it is impossible to prevent incorporation of foreign metals such as iron into the resulting lead monoxide.

As pointed above, each of the foregoing known methods for preparing lead monoxide specifies that lead suboxide as the raw material is oxidized under grinding or agitating conditions. This is based on the fact that if lead suboxide is heated in the state having no intimate contact with oxygen, lead suboxide is readily reduced to metallic lead. Accordingly, there has been no concept in the art that lead suboxide having a particulate or small mass-like form would be convertible to lead monoxide or other lead oxides such as red lead while retaining the original form.

It has now been found that when powdery lead suboxide is molded in granules in advance and the granules of lead suboxide are subjected to self-combustion at a lead oxide-forming temperature, i.e., a litharge (PbO) forming temperature or a red lead ($Pb_3O_4$) forming temperature or heated at such temperature in an oxygen-containing atmosphere or an oxygen- and steam-containing atmosphere, oxidization is accomplished uniformly even in the interiors of the granules and very pure litharge or red lead free of metallic lead and other impure metals is obtained.

It has been also found that when powder of silicon dioxide or the like is incorporated in advance into the starting powder of lead suboxide in the granulation of powdery lead suboxide and the mixture is calcined at the above-mentioned temperature, the reaction between lead oxide and silicon dioxide and granulation of the mixture are performed simulatneously to form a granular "brickette". These finding are quite suprising ones in view of the above-mentioned prevailing technical concept held in the art.

We have also found that when the above granular "brickette" formed by the granulating reaction between lead oxide and silicone dioxide is thrown as a lead bearing additive into a glass melting furnace, the amount of generated fume is much lower than when litharge or red lead is used and can be maintained at such a low level as attained by use of glassy lead silicate, and that the granular "brickette" is prominently excellent over a lead bearing additive for ceramic use consisting of glassy lead silicate in respect to the composition uniformity, the impurity content and the easiness in manufacture.

In the instant specification and claims, the term "brickette" is used to mean a brick-like solid having a granular or small mass-like form, and it must be noted that the "brickette" is quite different from so called "briquette".

In accordance with this invention, there is provided a process for the manufacture of granular lead compounds which comprises molding into granules (a) powdery lead suboxide or (b) powdery lead suboxide and at least one compound of an element selected from the group consisting of silicon, boron, aluminum and alkaline earth metals, the amount of said compound being 1 to 95% by weight based on the sum of lead suboxide and said compound, and maintaining the resulting granules in an oxygen-containing atmosphere at a temperature sufficient for formation of litharge or red lead.

Granular products obtained by granulating powdery lead suboxide prior to the heating in this invention are quite different from massy products formed in situ at the time of oxidizing powdery lead suboxide in the conventional known methods with respect to properties of the granules and behaviors to oxidation. The specific gravity of lead suboxide ($Pb_2O$) is 8.34, while the specific gravity of litharge (PbO) is 9.53 and that of red lead ($Pb_3O_4$) is 9.1. Thus, litharge or red lead has a higher specific gravity than that of lead suboxide, and because of such higher specific gravity litharge and red lead tend to form a denser coating. Accordingly, when powdery lead suboxide is oxidized as it is, it is construed that a massive product is obtained in which the periphery of lead suboxide is covered with a coating of litharge having a low oxygen permeability. This consideration is well in accord with the fact that powdery lead suboxide, which is relatively bulky, releases occluded air with advance of oxidization under heat and it passes through a state full of fluidity once during the course of oxidation ad with the other fact that massy products are obtained when powdery lead suboxide is oxidized as it is according to the conventional known methods which frequently contain metallic lead in the interior thereof.

In contrast, in the process of this invention, powdery lead suboxide is molded in advance to granules retaining the bulkiness inherent of lead suboxide and the oxidation is allowed to advance while maintaining this bulky granular state. Accordingly, it is construed that as lead monoxide is formed on the surface portion, the surface layer becomes porous, i.e., oxygen-permeable, with the result that even the interior of the granular product can be uniformly oxidized to lead monoxide.

Moreover, in the process of this invention, it is quite unnecessary to agitate or grind lead monoxide or its reaction mixture, and therefore, incorporation of metallic impurities from the apparatus wall caused by friction between lead oxide particles and the apparatus wall or by impingement of lead oxide particles against the apparatus wall is not brought about at all.

In the process of this invention, as lead suboxide is usually employed one formed by the so called Shimazu's method, namely a method comprising charging small masses of lead obtained by melting and solidifying lead, into a rotary drum, blowing compressed air into the drum being rotated, and thus converting the small masses into powder by friction and exfoliation. Of course, it is also possible to employ lead suboxide products prepared by other methods, as long as the metallic lead content is low. It is preferred that the powdery lead suboxide to be used in the process of this invention has an average particle size of less than 100 $\mu$, especially less than 50 $\mu$. It is also preferred that the starting lead suboxide has a composition expressed by the following formula $PbO_x$ wherein x is a number of from 0.4 to 0.9, especially 0.4 to 0.7.

One of essential features of the process of this invention resides, as pointed hereinabove, is that powdery lead suboxide is molded in granules prior to the oxidation treatment. Any of dry and wet granulation methods can optionally be adopted for molding powdery lead suboxide into granules in the process of this invention. For instance, powdery lead suboxide can be molded, as it is in the dry state, into granules by means of a granulator such as a tablet machine. It is also possible to mold powdery lead suboxide into granules according to a wet method in which an aqueous medium such as water and an aqueous solution of an acid, alkali or salt or a volatile organic solvent is employed as a granulation medium and an optional granulator, e.g., a spray drier, an extruder, a pelletizer, a blender granulator of the agitator type, a rotary disc granulator or a centrifugal granulator, is used as the granulation means. The acid to be used in the form of an aqueous solution is suitably chosen, depending on the intended use of the product, from volatile acids such as hydrochloric acid and nitric acid and non-volatile acids such as boric acid and silicic acid. As the alkali to be used in the form of an aqueous solution, there may be mentioned, for instance, volatile bases such as ammonia, and hydroxides of alkali metals and alkaline earth metals. The salt to be used in the form of an aqueous solution is suitably chosen, depending on the intended use of the product, from salts formed from the foregoing acids and bases, and silicates, aluminates and borates. As the volatile organic solvent, there can be mentioned, for instance, low-boiling-point hydrocarbons, halogenated hydrocarbons, ethers, ketones and alcohols. In case such liquid medium is employed as the granulation medium, the amount of the liquid medium can be varied within a broad range of from an amount necessary for forming a slurry of powdery lead suboxide to an amount necessary for imparting a minimum bonding adhesiveness necessary for granulation to a powdery lead suboxide. In general, this amount of the liquid medium is within a range of from 8 to 15 parts by weight, preferably 9 to 12 parts by weight, per 100 parts by weight of lead suboxide powder. In the instant specification and claims, the parts and percents (%) are on the weight basis unless otherwise indicated.

In this invention, it is especially preferred that water or an aqueous medium is used as the granulation medium. Granules obtained by employing water or an aqueous medium as the granulation medium are advantageous over granules obtained by other procedures, because they exhibit a higher rate of oxidation to litharge and they are converted to litharge more uniformly even in the interior portions thereof. Further, water is not expensive and use of water facilitates the granulation operation.

In this invention, it is preferred that in granulation of powdery lead suboxide a liquid or solid oxidant is added to the starting lead suboxide powder. As such liquid or solid oxidant, there may be employed, for instance, nitric acid, acids expressed by the following formulae $$HXO_3 \text{ and } HXO_4$$

wherein X stands for a halogen atom, e.g., bromine, chlorine or iodine, salts of these acids such as alkali metal salts of these acids, and hydrogen peroxide. It is preferred that such oxidant is employed in an amount of 0.1 to 20% by weight, especially 1 to 10% by weight, based on the starting lead suboxide powder. When such liquid or solid is employed, oxidation of lead suboxide to litharge or red lead is highly accelerated.

In case the productof this invention is used for formation of crystal galsses, optical glasses, lead glasses, stabilizers, pigments and the like, it is possible to incorporate in the starting lead suboxide powder at least one component selected from siliciferous components such as silica, silica gel, silica sol and sodium silicate, boric components such as borax, boric acid and sodium borate, alumina components such as alumina, alumina gel, alumina sol and aluminates, and alkaline earth metal components such as gypsum, calcium carbonate, strontium carbonate, barium carbonate, magnesium carbonate and magnesium oxide. These components are incorporated in amounts, calculated as $SiO_2$, $B_2O_3$, $Al_2O_3$ and/or MO (in which M is an alkaline earth metal), of 1 to 95%, preferably 5 to 90%, based on the total amount of the feed. These silica, boric, alumina or alkaline earth metal components may be incorporated by the dry method or together with an aqueous medium. In case such components are incorporated in advance at the time of granulation, it is possible to obtain easily premixtures suitable for the intended use of the end product, and moreover, oxidation of lead suboxide to litharge or red lead is highly accelerated by addition of these components and in an embodiment employing silicon dioxide or a silicate as one starting material, which will be detailed hereinafter, the reaction is allowed to advance between lead oxide and each of these components. This is also one of surprising findings made by us.

In the process of this invention, the particle size of the granulated lead suboxide may be varied within a broad range, but in general, it is preferred that the graulated lead suboxide has a particle size of from 0.1 to 20 mm, especially 0.5 to 10 mm. In case the granulated product has a particle size exceeding 20 mm, a long time is required for the interior of the granule to be oxidized sufficiently. When the particle size is less than 0.1 mm, the above-mentioned advantages attained by molding lead suboxide into granules prior to oxidation are not obtained. The form of the graulated product is not particularly critical in this invention, as far as it has a particle size included within the above range. For instance, the granulated product may taken any of forms of globes, tablets, particles, columns, cylinders, dice, sand-like particles, flakes and the like.

It is preferred that the granulated product of lead suboxide to be used in the process of this invention has an apparent density expressed by the following formula, though it varies to some extent depending on the granulation means, the composition of the granulated product and other factors:

$$D = K (Xd_x + \sum_{x=1}^{m} Y_n d_n)$$

wherein $D$ is an apparent density of the granulated product in g/cc, $d_x$ is a true density of lead suboxide, namely a number of from 8.0 to 9.0, $d_n$ is a true density of a compound of silicon, boron, aluminum or an alkaline earth metal incorporated and present in the granulated product, $X$ stands for the weight ratio of lead suboxide in the total granulated product, $Y_n$ stands for the weight ratio of the compound having the true density $d_n$, $m$ designates the number of kinds of compounds incorporated in the granulated product, and $K$ is a number of from 0.2 to 0.85.

From the technical viewpoint, it is difficult to increase the value of $K$ in the foregoing formula above 0.85, and the $K$ value exceeding 0.85 involves a problem as regards uniform oxidation in the interior of the granulated product. In case the $K$ value is less than 0.2, the granulated product tends to disintegrate during the oxidation treatment, resulting in formation of dusts of lead. Further, a corse mass or agglomerate is formed in the granulated product, preventing the interior portion from being uniformly oxidized. In this invention, it is especially preferred that the $K$ value is within a range of from 0.5 to 0.8.

In this invention, the so formed granules of lead suboxide are maintained at a lead oxide-forming temperature in an oxygen-containing atmosphere under such conditions that the granular form can be retained in the granulated product. For instance, if litharge is an intended lead oxide product, the granules are maintained at 350° to 700°C., preferably 400° to 650°C., and in case the intended lead oxide product is red lead, litharge is once formed by the treatment at the above temperature and it is maintained at 350° to 500°C., preferably 400° to 450°C. Air or pure oxygen is usually employed as the oxygen-containing atmosphere, but it is also possible to employ a gaseous mixture of oxygen with other diluent gas such, for example, as steam, nitrogen and carbon dioxide gas.

Such oxygen-containing atmosphere may be maintained under atmospheric pressure or elevated pressure, and it is also possible to maintain the oxygen-containing atmosphere under slightly reduced pressure. The maintenance of granules of lead suboxide at the abovementioned temperature can be accomplished by utilizing the heat generated by combustion of lead suboxide or effecting the heating from the outside. In case the temperature ie excessively heightened by the heat generated by selfcombustion of lead suboxide, it is permissible to effect the cooling from the outside.

The time required for completion of the reaction varies considerably depending on such factors as the diameter of the granulated product, the bulk density (packing density) of the granulated product, the granulation means, the kind of the oxygen-containing atmosphere and the temperature, but in the case of oxidation of lead suboxide to litharge the reaction time is appropriately chosen within a range of from 5 minutes to 1 hour, and in the case of oxidation of litharge to red lead, the reaction time is appropriately chosen within a range of from 5 minutes to 1 hour. In case an oxidation promotor such as nitric acid and a nitrate is used to accelerate the oxidation, the oxidation time can be greatly shortened.

In this invention it is important that the oxidation treatment is carried out under such conditions that granules of lead suboxide can retain the original granular form. Various procedures are adopted for the oxidation treatment depending on the form-retaining property and abrasion resistance of granules of lead suboxide to be oxidized. For instance, when the granulated product is one formed by employing water as the granulation medium and has high form-retaining property and high abrasion resistance, it is possible to employ a calcination furnace of the moving bed type such as rotary furnace, and it is permissible to employ even a calcination furnace of the fluidized bed, e.g., a so called swelling bed or boiling bed furnace. Of course, when granules have relatively low form-retaining property or low abrasion resistance, a calcination furnace of the fixed bed type may be used. At any rate, in accordance with this invention, when powdery lead suboxide is molded into granules prior to the oxidation treatment and the granules are oxidized under such conditions that their form can be retained throughout the oxidation treatment, it is made possible to prevent incorporation of foreign metals constituting the reactor wall into the resulting oxidation product, i.e., litharge or red lead.

In accordance with this invention, the area of the contact between the granulated product and the reaction vessel wall is lessened and hence, the friction between the granulated product and the reaction vessel wall can also be diminished. Therefore, even if a reaction vessel composed of iron is employed, incorporation of iron impurities into the oxidation product can be greatly reduced. Of course, if it is desired to further reduce incorporation of iron impurities, it is convenient to employ a reaction vessel composed of a refractory material.

According to the above-explained process of this invention, lead monoxide (litharge) or red lead, or a lead oxide containing an alumina, siliceous, boric or strontium component added as the glass component or a reaction product of a lead oxide with such glass component, can be easily obtained in the annular form easy to handle without scattering of dusts. This is one of great advantages of this invention. In the conventional methods, lead dusts are scattered when a lead oxide product such as litharge and red lead is withdrawn from the reaction apparatus, and there is a great danger that workers suffer lead poisoning. In contrast, in this invention, since scattering of lead dusts can be completely prevented, the above danger of lead poisoning involved in the conventional method is not encountered. Moreover, in granular litharge or red lead prepared according to the process of this invention, the metallic lead content is extremely low, and also the contents of foreign metals such as iron are extremely low. Therefore, the granular litharge or red lead of this invention, as it is or after it is pulverized by the dry or wet method using a ball mill or the like, or it is molten and then ground or pulverized, can be used advantageously as the starting material for formation of pigments, lead type stabilizers, optical glasses and the like.

In accordance with one preferable embodiment of this invention, there is provided a lead bearing additive for use in ceramic industry consisting essentially of brickettes in which the weight ratio of lead oxide and silicon dioxide, expressed as $PbO : SiO_2$, is within the following range:

$PbO : SiO_2 =$ from $93 : 7$ to $30 : 70$.

Lead-containing glasses such as optical glasses and tube lamp glasses have heretofore been prepared by a method comprising feeding litharge or red lead with glass-consituting main components such as silica into a melting furnace and melting the mixture. At the time of feeding litharge or red lead to a melting furnace and melting the same, however, serious problems such as generation of lead oxide fumes, scattering of lead-containing dusts during handling of the starting mixture and carry-over of such dusts by the combustion gas during the melting operation are brought about. As a result of our research works, it was confirmed that the amount of the lead component discharged or scattered in the form of the lead oxide fume generated in the melting furnace, the lead-containing dust scattered during handling and the lead-containing dust carried over by the combustion gas is as high as about 15% of litharge or red lead fed to the melting furnace. This means a great loss of litharge or red lead and causes a serious pollution problem.

Furthermore, this conventional method involves problems also with respect to the process operation. More specifically, since the specific gravity of the starting lead material such as litharge and red lead is much higher than the specific gravity of the glass-constituting main component such as silica, the melting point of litharge or red lead is much lower (870° to 900°C.) than that of silica or the like, and since litharge or red lead is usually in the finely divided powder form, when it is mixed with glass-forming materials and thrown into a melting furnace, only the lead oxide component is collected in the lower portion of the melting furnace and litharge alone is molten prior to reacting with silica, with the result that undesired segregation is frequently brought about and the glass composition becomes heterogeneous. This is one of fatal defects of the conventional technique. Furthermore, though it is important that the added lead component is uniformly molten and dispersed, it is difficult to attain such uniform melting or dispersion of the lead component in the conventional method. If such uniform melting or dispersion is not attained, striae are formed in the resulting glass molded article.

In order to overcome the above defects involved in using litharge or red lead as a lead bearing additive, it has been proposed to employ a lead bearing additive consisting of a cullet of a lead silicate glass containing lead oxide (PbO) such as litharge and red lead and the siliciferous component at the following weight ratio:

$PbO : SiO_2 = 85 : 15$.

Although this lead silicate glass cullet is advantageous in that generation of lead fumes is extremely low regardless of a high lead content, preparation of this lead silicate glass cullet involves various difficulties. This cullet of lead silicate glass is prepared by melting a siliciferous component such as silica and litharge in a melting furnace and reacting them in the molten state, and molding the resulting lead glass into a cullet. In this method, the amount used of litharge is great as compared with the siliciferous component and litharge has a high basicity. Therefore, refractory bricks of the melting furnace are easily corroded and they must be exchanged frequently. For this reason, the manufacturing cost of the lead bearing additive is high and it exerts great influences on the cost of the end lead glass product. Further, corrosion of materials of a melting furnace should naturally result in incorporation of detested impurities such as iron and chromium in the lead glass product.

In connection with this conventional method for preparing a lead bearing additive consisting of a lead silicate, we found that when a great quantity of lead oxide and a small amount of silicon dioxide are molten and reacted with each other, the lead oxide having a higher specific gravity and a lower melting point is at first molten and sedimented on the furnace bottom and the reaction is advanced in such a state that silicon dioxide floats in this molten lead oxide phase, and that in case it is intended to prepare homogeneous lead silicate by this method, the melting reaction between the lead oxide and siliciferous component should be conducted for a long time, resulting in further advance of corrosion of the furnace material, and in case the reaction is carried out under such conditions as will reduce the corrosion of the furnace material, the resulting lead bearing additive of the lead silicate type has a heterogeneous composition.

As a result of experiments made by us, it was confirmed that when a melt of this heterogeneous lead silicate glass is thrown into water to form granular cullets, this non-uniformity of the composition of the lead silicate glass exerts great influences on the particle size and composition of the resulting cullets. For instance, in the case of lead silicate glass cullets formed from a melt of a mixture of the composition of $PbO : SiO_2 = 85 : 15$, the PbO content is less than 80% in cullets of a size greater than 8 mesh, 84 – 86% in cullets of a size of 8 to 80 mesh and more than 90% in cullets of a size smaller than 80 mesh. Thus, it was confirmed that the composition of the lead silicate glass cullet formed by the above-mentioned conventional method is very heterogeneous.

Another defect brought about by employing a lead silicate glass cullet as a lead bearing additive for use in ceramic inductry is that since the cullet is molten more rapidly than glass-constituting main components such as silica in a furnace for manufacture of lead glasses, and it frequently happens that the melting reaction between the lead bearing additive and the siliciferous component is not sufficiently advanced.

We have found that in preparing granular litharge or granular red lead from the above-mentioned granular product of lead suboxide, when silicon dioxide is intimately mixed with such granules of lead monoxide, the reaction between lead monoxide and silicon dioxide is caused to occur simultaneously with the formation of lead monoxide and the above-mentioned novel brickette is formed as a result of said reaction. It has also been found that lead oxide other than powdery lead suboxide, i.e., preformed powder of litharge or red lead has a property of reacting readily with powder of silicon dioxide in a suitable granulation medium such as an aqueous medium or at a high temperature not exceeding the melting point, and that when powdery lead oxide and powdery silicon dioxide are mixed in a suitable granulation medium and molded into granules and they are dried or calcined at a high temperature according to need, a lead bearing additive for use in ceramic industry can similarly obtained in the brickette form.

In the lead bearing additive for use in ceramic inductry according to this invention, it is important that the weight ratio of lead oxide (PbO) and silicon dioxide ($SiO_2$) is within a range of from 93 : 7 to 30 : 70, especially from 93 : 7 to 50 : 50. When the lead oxide content exceeds the above range, the amount of lead oxide fume generated is extremely increased, and in case the lead oxide content is below the above range, the lead concentration in the resulting lead bearing additive is too low. Accordingly, in each case, the objects of this invention cannot be attained sufficiently.

The lead bearing additive of this invention for use in ceramic industry consisting of such brickettes as mentioned above is prepared, for instance, by mixing powder of a lead oxide component and powder of a silicon dioxide component at a mixing ratio included within the above range, molding the mixture into granules in the presence of a granulation medium such as an aqueous medium, and drying or calcining the granules at a temperature lower than the melting point of the mixture during or after the granulation operation.

Litharge (PbO) and read lead ($Pb_3O_4$) are used as the lead oxide component in addition to lead suboxide. Either lemon litharge or litharge orange can be used as the litharge. As the lead suboxide are used those having a composition as described hereinabove. It is preferred that these lead oxide components have an average particles size of less than 100 $\mu$, especially less than 50 $\mu$.

It is possible to employ purified or unpurified silica as the silicon dioxide starting material, but it is also possible to employ mineral materials and clay minerals composed mainly of silica gel, silica sol, quartz powder, sodium silicate, sodium polysilicate, silicic anhydride or a silicate, or purified products of these minerals.

The prominent feature of this preferable embodiment of this invention is based on the finding that when powder of a lead oxide component and a powder of a silicon dioxide component are mixed in a granulation medium such as water and the mixture is dried or calcined according to need, the reaction is caused to occur between the lead oxide and silicon dioxide components and formation of brickettes by the strong linkage between the lead oxide component powder and the silicon dioxide component powder is allowed to advance.

While we were continuing research works leading this invention, we obtained the following interesting experimental results. In case lemon litharge and silica are intimately mixed in the presence of water at a mixing weight ratio of $PbO : SiO_2 = 65 : 35$, the mixture is molded into granules and they are dried, a brickette having a hue a little lighter than the hue of lemon litharge is obtained, and when red lead and silica are mixed intimately in the presence of water at a weight ratio of $PbO : SiO_2 = 65 : 35$ and the mixture is similarly granulated and dried, a brickette having a hue a little lighter than the hue of the starting red lead is obtained. When these brickettes are subjected to a heat treatment, with advance of the heat treatment, their hues become lighter and are whitened at the final stage. When the X-ray diffraction patterns are determined with respect to the so obtained brickettes, results, such, for example, as shown in FIG. 1, are obtained.

More specifically, a mixture of litharge and silica powder prepared in Example 9 given hereinbelow was molded into granules having a diameter of 7 - 0.1 mm, the granules were treated at a prescribed temperature (room temperature, 115°C., 200°C., 600°C. or 700°C.) and resulting brickettes were subjected to the X-ray diffractiometry. X-ray diffraction patterns were obtained according to the PC-method by Cu–Kα at a voltage of 35 KV and a current of 20 mA by employing an X-ray diffractometer of model DF-2 manufactured by Rigaku Denki. In FIG. 1, A is an X-ray diffraction pattern obtained when the starting litharge and silica powder were mixed in the absence of water, and X-ray patterns, B, C, D, E and F are those obtained when the brickette was treated at room temperature, 115°C., 200°C., 600°C. and 700°C., respectively. Further, symbols ○, △, ×, □ and ▽ indicate $PbSiO_3$, $Pb_2SiO_4$, $Pb_3Si_2O_7$, $\gamma$-$Pb_4SiO_6$, respectively, and the symbol ☆ designates $SiO_2$ (quartz) and the symbol ⊙ indicates lead oxides, i.e., PbO (lemon), PbO (orange), $\alpha$-$PbO_2$, $\beta$-$PbO_2$, $Pb_3O_4$ and $Pb(OH)_2$.

Figure 1:
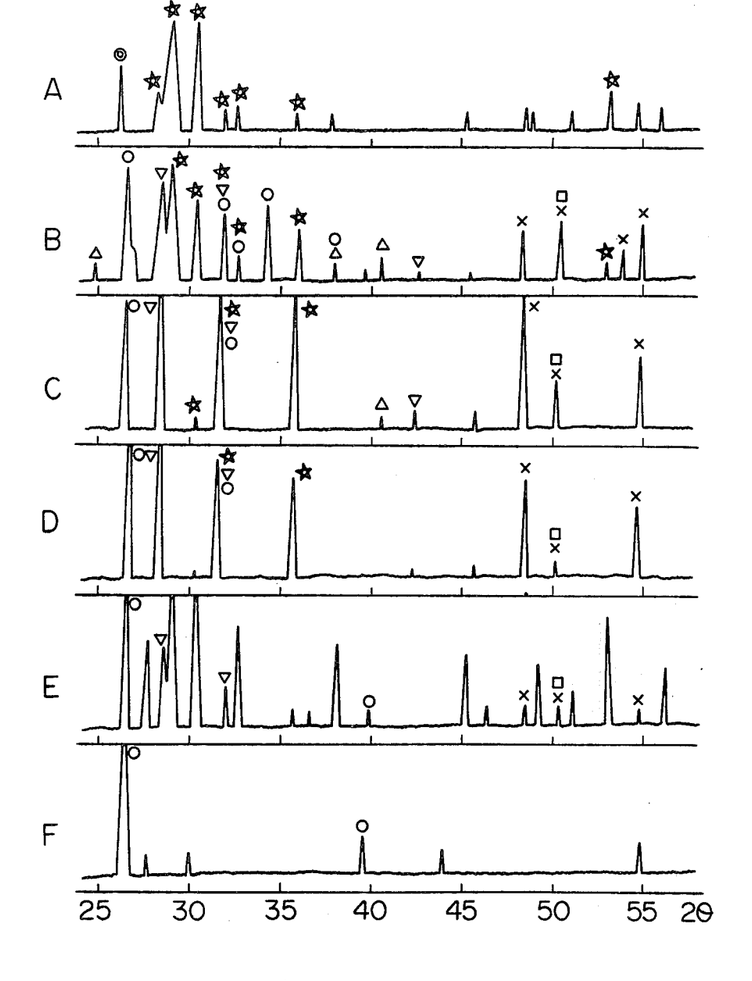

As is apparent from the results shown in FIG. 1, although the product obtained by mixing the starting litharge and silica powder in the absence of water is a mere mixture (see the pattern A), in products obtained by mixing the starting litharge and silica powder in the presence of water and drying the mixture, formation of lead silicate is confirmed even when the drying is conducted at room temperature. Of course, it is understood that with elevation of the treatment temperature, formation of lead silicate becomes conspicuous. Apart from such X-ray diffraction patterns, it will readily be understood from observation of changes in the hues of the brickettes caused during the heat treatment that the reaction is advanced between litharge and silica sufficiently. More specifically, the hues of the brickettes treated at each of the above temperatures vary from a brown color observed just after the mixing to a white color through a light yellow color with passage of the heat treatment time.

These experimental results show that when a lead oxide component and a silicon dioxide component are mixed in the presence of a granulation medium such as an aqueous medium without melting them and the mixture is dried or calcined at a temperature not exceeding the melting point thereof, the lead silicate-forming reaction is allowed to advance effectively between the two components to form a brickette which is integrally bonded strongly.

When the so obtained brickettes were compared with known lead bearing additives and mere mixtures of lead oxide and silicon dioxide with respect to the amount of fume generated, results shown in the following Table 1 were obtained.

Table 1

| Lead Bearing Additive | Composition (%) | | Amount of Fume Generated |
|---|---|---|---|
| | PbO | $SiO_2$ | (% as measured at 1050°C.) |
| Litharge | 100 | — | 1.50 |
| Red Lead | 100 | — | 1.52 |
| Homogeneous Lead Silicate Glass | 85 | 15 | 0.47 |
| Litharge/Silica Mixture | 85 | 15 | 1.28 |
| Litharge/Silica Brickette | 85 | 15 | 0.48 |
| Red Lead/Silica Brickette | 85 | 15 | 0.49 |

The amount of fume generated was measured by the following method.

One gram of a sample weighed accurately was charged in an alumina crucible and the crucible was placed in an electric furnace maintained at a prescribed temperature (1050° ± 20°C.). The weight of the component volatilized under this condition was determined from the weight decrease of the sample.

From the results shown in Table 1, it is understood that in the lead bearing additive obtained by granulating and reacting a lead oxide component with silicon dioxide without melting them, the amount of fume generated can be maintained at an extremely low level as compared with the case of lead oxide alone or a mere mixture of lead oxide and silicon dioxide and at a level almost comparable to the level attained in the case of a lead bearing additive composed of lead silicate. As is apparent from the above-mentioned experimental results, this is due to the fact that in the lead bearing additive of this invention composed of specific brickettes, lead oxide and silicon dioxide are reacted with each other to form lead silicate while hardly generating fume and none of free lead oxide components constituting the main cause of generation of fume are present.

In this invention, the mixing of a lead oxide component and a silicon dioxide component and the molding of the mixture into granules can be performed according to the methods detailed hereinabove, and such liquid media as mentioned above are preferably used as the granulation medium.

In molding the above lead oxide and silicon dioxide components into granules in this invention, it is possible to incorporate as a ceramic additive at least 0.01% by weight, based on the final brickette, of at least one member selected from boric components such as borax, boric acid and sodium borate, alumina components such as alumina, alumina sol and aluminates, alkaline earth metal components such as gypsum, calcium carbonate, strontium carbonate, strontium nitrate, barium carbonate, barium oxide, magnesium carbonate and magnesium oxide, alkali metal components such as sodium carbonate, potassium carbonate, sodium nitrate, sodium sulfate and potassium oxide, white oxides such as titanium oxide, zinc oxide, zirconium oxide and antimony oxide, phosphorus oxyacids and their salts such as sodium phosphate, potassium phosphate and phosphorus pentoxide, defoaming agents such as sodium chloride, potassium chloride, sodium sulfate and barium sulfate, decoloring agents such as arsenious acid and cerium oxide, and coloring agents such as cobalt oxide, copper oxide, nickel oxide, chromium oxide, cadmium oxide, cadmium sulfide, selenium, tellurium, rare earth elements, gold, silver and uranium. In case such boric, alumina, alkali metal and/or alkaline earth metal components are mixed in advance in the granulation of the lead oxide and silicon dioxide components, a premixture suitable for the intended use of the end product can be obtained with ease.

The mixing and granulation of lead oxide powder and silicon dioxide powder may be performed in a granulation medium by one-stage operation or by multi-stage operation. For instance, a mixture of these components is once formed and then the mixture is molded into granules by means of an optional graulator selected from tablet machines, spray driers, extruders, pelletizers, rotary disc granulators and centrifugal granulators. It is also possible to conduct the mixing and granulation at one stage by feeding lead oxide powder, silicon dioxide powder and a granulation medium into a moving granulator of the agitator type.

The so obtained granules are dried or calcined under such conditions that the granules can retain the original granular form. The drying or calcining temperature varies considerably depending on the mixing and granulating conditions. For instance, in case an aqueous medium is used as the mixing and granulating medium, the granulation reaction is greatly advanced in the resulting granules, and therefore, intended brickettes can readily be obtained by subjecting them under mere drying conditions, e.g., air-drying conditions. In case the mixing and granulation is carried out in the powdery state without employing a granulation medium or in the presence of a non-aqueous granulation medium, it is necessary to heat-treat the resulting granules at a temperature higher than 200°C. but not exceeding the melting point of the mixture.

In this invention, in each of the above cases, in order to improve the form-retaining property and the abrasion resistance of the resulting brickettes, it is preferable to conduct the heat treatment at a temperature ranging from 350° to 700°C. When the granules of lead oxide and silicon dioxide are subjected to such heat treatment, the reaction between lead oxide powder and silicon dioxide powder (by which lead silicate is formed) and the brickette-forming reacting (by which granules are converted to tightly bonded brickettes by sintering or calcination) are further advanced. The time necessary for such heat treatment varies depending on the kind and mixing ratio of the lead oxide powder or the heat treatment temperature, but generally speaking, a time sufficient to advance the lead silicate-forming reaction and brickette-forming reaction between lead oxide and silicon dioxide completely is selected within a range of from 5 minutes to 1 hour. In case media containing the above-mentioned acids such as hydrochloric acid, nitric acid and acetic acid or their salts are used as the granulation medium, the temperature of the above heat treatment for formation of brickettes can be lowered or the time of the heat treatment can be shortened.

The kind of the heat treatment atmosphere is not particularly critical in this invention, as far as it is a non-reductive atmosphere. For instance, the heat treatment can be performed in air, oxygen, nitrogen, carbon dioxide gas, steam, gases formed by combustion of various fuels, and mixtures of these gases. The heat treatment atmosphere may be maintained under atmospheric pressure, elevated pressure or slightly reduced pressure.

One of advantages of this embodiment of this invention is that powdery lead suboxide is used as the starting lead oxide powder. For instance, when granules of powdery lead suboxide and powdery silicon dioxide are maintained at the above temperature in an oxygen-containing atmosphere, not only the oxidation of lead suboxide to a lead oxide such as litharge or red lead, but also the lead silicate-forming and brickette-forming reactions between the lead oxide and silicon dioxide are allowed to advance smoothly. Further, in this case, since the granules of powdery lead suboxide and silicon dioxide are relatively porous, the oxidation of lead suboxide to litharge and/or red lead and the lead silicate-forming and brickette-forming reactions are fully advanced uniformly even in the interiors of the granules, and unreacted lead suboxide is substantially not left in the resulting brickettes of lead silicate.

In order to heat-treat granules of the mixture of lead oxide and silicon dioxide under such conditions that the granules can retain the original granular form, a suitable method can be chosen from the above-mentioned various calcination methods appropriately depending on the form-retaining property and abrasion resistance of the granules.

The particle size of the lead bearing additive for use in ceramic industry according to this invention may be varied within a broad range, but in general, it is preferred that the particle size is within a range of from 0.1 to 10 mm, especially 0.5 to 5 mm. In case the particle size is less than 0.1 mm, intended advantages by granulation are not attained, and when the particle size is greater than 10 mm, it becomes difficult to mix the resulting brickettes uniformly with glass-constituting components.

The lead bearing additive for use in ceramic industry composed of granular brickettes according to this invention has an apparent density expressed by the following formula, though it varies to some extend depending on the granulation means, the heat treatment conditions and the composition of the additive:

$$D = Kd(Xd_x + Yd_y + \sum_{n=1}^{m} Z_n d_n)$$

wherein $D$ designates an apparent density in g/cc of the granular lead bearing additive, $d_x$ stands for a true density of lead oxide, for instance, 9.53 in the case of litharge (PbO) or 9.1 in the case of red lead ($Pb_3O_4$), $d_y$ designates a true density of silicon dioxide, for instance, a number ranging from 2.2 to 2.65, $d_n$ indicates a true density of a metal compound present in the lead bearing additive, such as an alkali metal, an alkaline earth metal, boron, aluminum, titanium, or zirconium, $X$ stands for the weight ratio of the lead oxide component (calculated as PbO) in the lead bearing additive, $Y$ designates the weight ratio of the silicon dioxide component (calculated as $SiO_2$) in the lead bearing additive, $Z_n$ is the weight ratio of the compound having the true density $d_n$, $m$ is the number of auxiliary components contained in the lead bearing additive, and $Kd$ is a number of from 0.2 to 0.85, preferably 0.2 to 0.7.

The apparent density $D$ is measured by the following method.

A prescribed amount, weighed accurately, of a sample brickette (for instance, 10 g) is charged in a packing density-measuring test tube packed with a prescribed amount (for instance, 10 g) of a finely divided substance such as fine powder of basic lead silicate of PbO content of 85% having a particle size of 4 to 1 $\mu$. The brickette sample is embedded in this finely divided substance, and according to the conventional method for measurement of the packing density of powder, the packing volume measured when the brickette sample is not charged is reduced from the packing volume measured when the brickette sample is packed, and the apparent density is determined from the so obtained difference in the volume and the weight increased by packing of the brickette sample.

From the X-ray diffractiometry it can readily be confirmed that in granular lead bearing additive for use in ceramic industry according to this invention the lead oxide component is reacted with the silicon dioxide component. As detailed hereinabove, the lead bearing additive of this invention consisting of granular brickettes, though the starting components are not molten substantially, exhibits an X-ray diffraction pattern inherent of such lead silicate as $PbSiO_3$, $Pb_2SiO_4$, $Pb_3Si_2O_7$, $\gamma$-$Pb_4SiO_6$ or $\alpha$-$Pb_4SiO_6$. In the granular lead bearing additive of this invention, it is not necessary that all of the lead oxide component should be present in the form of lead silicate, but it is permissible that a part of the lead oxide component is present in the form of litharge or red lead. Also in the latter case, generation of fume is conspicuously inhibited and the product exhibits excellent compression resistance and abrasion resistance. This can readily be understood from the fact that lead oxide-silicon dioxide granular brickettes having a hue inherent of lemon litharge, litharge orange or red lead exhibit as low a level of lead oxide fume generation as that of lead silicate glass cullets and said brickettes have such a high compressive strength as 4 Kg/cm.

The granular lead bearing additive of this invention can be clearly distinguished from mere granules of litharge or red lead, mere mixtures of litharge or red lead with silicon dioxide and conventional lead bearing additives consisting of lead silicate glass cullets not only with respect to an appearance of the peculiar brickette (brick-like small granule) and the X-ray diffraction pattern but also with respect to the reactivity with nitric acid.

More specifically, the lead bearing additive for ceramic use according to this invention is characterized in that the nitric acid reactivity (RN, %), defined by the following formula, is generally within a range of from 10 to 96.5 %:

$$RN = \frac{X_1}{X_o} \times 100$$

in which $X_1$ designates the amount in grams of the dissolved lead oxide component measured when about 5 g of a sample is reacted at room temperature under agitation for 20 minutes in 50 ml of 1.34N nitric acid. $X_o$ stands for the amount in grams of the total lead oxide component contained in the sample and RN is the nitric acid reactivity (%) of the sample.

In the case of mere granules of litharge or red lead or mere mixtures of litharge or red lead with silicon dioxide, the lead oxide component reacts with nitric acid almost completely, and therefore, the value of the nitric acid reactivity approximates 100 %. In the case of lead silicate glass cullets formed by melt-reacting completely lead oxide and silicon dioxide, the nitric acid reactivity is much lower than 10 %, though it is not zero. The lead bearing additive of this invention consisting of granular brickettes exhibits a nitric acid reactivity intermediate between the nitric acid reactivities of the above-mentioned two conventional bearing additives.

The lead bearing additive of this invention composed of granular brickettes has prominent advantages over conventional lead bearing additives for use in ceramic industry. Lead bearing additives for use in ceramic industry consisting of litharge or red lead, which have heretofore been used most broadly, are defective in that generation of lead oxide fume is extreme and at the admixing treatment or when they are thrown into a melting furnace, formation of lead oxide dusts cannot be avoided. Further, these lead bearing additives have a specific gravity much higher than glass-constituting components such as silica, and therefore, at the admixing operation or melting operation undesired segregation is readily caused to occur. In contrast, in the lead beaing additive of this invention, the generation of lead oxide fume can be maintained at a very low level as in the case of lead bearing additives composed of lead silicate glass cullets, and the lead bearing additive of this invention is much excellent over such conventional lead bearing additives composed of lead silicate glass cullets with respect to low impurity contents. More specifically, in the case of conventional lead silicate cullets obtained by melt-reacting lead oxide and silicon dioxide, because of strong basicity of the lead component, a furnace-constituting material is eluted and hence, incorporation of foreign metal components into the cullets cannot be avoided. In contrast, according to this invention, brickettes are formed without melting lead oxide or silicon dioxide, and therefore, the contact of the lead component in the molten state with a furnace material can be prevented. Further, the area of the contact between the lead component and furnace material is extremely small. Accordingly, incorporation of foreign metal impurities can be prevented effectively. Moreover, according to this invention, even in case a lead oxide component and silicon dioxide are heat-treated at a relatively low temperature for a short time, the chemical composition is uniform throughout the entire granules in the lead bearing additive of this invention, and the resulting granular lead bearing additive can be blended in a raw material of glass very easily. Thus, as compared with conventional processes in which both the lead oxide component and the silicon dioxide component are reacted in the molten state, apparently the process of this invention is excellent and industrially advantageous with respect to easiness in the manufacturing operation, the manufacturing cost and the like.

According to the conventional concept held in the art, cullets are prepared by forming litharge in advance, pulverizing it, adding silica, borax and the like to the pulverized litharge and throwing the mixture into a melting furnace. Accordingly, when litharge is pulverized, silica or the like is incorporated or when the starting mixture is thrown into a melting furnace, lead dusts are scattered around and it is very difficult to maintain the health in workers. In contrast, in accordance with the preferable embodiment, silica or the like is added to lead suboxide in the presence of water, the mixture is molded in granules and oxidation of lead suboxide to litharge and the brickette-forming reaction between litharge and silica can be accomplished simultaneously. Accordingly, scattering of dusts can be prevented almost completely.

The lead bearing additive composed of granular brickettes according to this invention has high compressive strength and excellent abrasion resistance. If pulverization by abrasion is desired to be maintained at a much lower level, it is possible to vitrify only the surface portions of granular brickettes. In this case, the surface portions are exposed for a short time to a temperature higher than the melting point of lead silicate e. g., a temperature exceeding 750°C. This can readily be attained by applying a flame for a short time on the surfaces of brickettes or letting brickettes fall in an atmosphere maintained at a temperature exceeding 750°C. The vitrification can also be performed by forming a water glass layer on the surfaces of brickettes by dipping them into a water glass solution and then drying them.

As in the conventional lead bearing additives composed of litharge or red lead, the lead bearing additive of this invention is incorporated in a raw glass material or a subsidary raw material and thrown into a melting furnace, and such melt can be formed into glasses for various tubes such as neon tubes, fluorescent lamps, vacuum tubes, Braun tubes and other lamp tubes, high refractive index optical glasses, crystal glasses, imitation jewel glasses and glazing glasses. For instance, the following composition is known as that of an optical glass:

| | |
|---|---|
| $SiO_2$ | 28 – 55 % |
| PbO | 19 – 70 % |
| $Na_2O$ | 0.5 – 5 % |
| $K_2O$ | 1 – 15 % |
| MgO | 0 – 14 % |
| CaO | 0 – 9 % |
| BaO | 0 – 11 % |
| ZnO | 0 – 6 % |
| $B_2O_3$ | 0 – 2 % |
| $As_2O_3$ | 0.2 – 0.5 % |

Thus, the lead bearing additive for use in ceramic industry according to this invention is incorporated in such an amount that the above PbO content is attained in the resulting glass. As the tube lamp glass, a composition having the following main ingredients:

| | |
|---|---|
| $SiO_2$ | 50 – 75 % |
| PbO | 20 – 35 % |
| $Na_2O$ | 3 – 16 % |
| $K_2O$ | 2 – 8 % |
| $Al_2O_3$ | 0.1 – 4 % |
| CaO | 0 – 8 % | or a composition in which a part of the above $SiO_2$ is replaced by $B_2O_3$ or $P_2O_5$, has been known. Thus, the lead bearing additive for use in ceramic industry according to this invention is incorporated in such an amount that the above PbO content is attained in the resulting glass.

The lead bearing additive for use in ceramic industry according to this invention is especially useful for formation of such lead glasses as mentioned above. In addition, by dint of such properties of the lead bearing additive of this invention that generation of lead fume is extremely low at the time of heating and melting and the melt-dispersibility is very excellent, it can also be used effectively and conveniently for formation of frit glazes and Bristol glazes.

It is generally preferred that the lead bearing additive composed of brickettes according to this invention is used in the as-prepared granular form, but if desired, it can be pulverized and incorporated in the powdery form in various raw materials and subsidary raw materials for glasses or in various raw materials and subsidary raw materials for glazes, and it can be utilized in various application fields. In this case, even if the brickettes of this invention are pulverized, the uniform composition can be retained and the tendency of segregation is extremely low. This is another advantage of the lead bearing additive of this invention.

This invention will now be illustrated in more detail by reference to Examples.

EXAMPLE 1

This Example illustrates an embodiment where lead oxide is prepared by molding powdery lead suboxide into granules and heat-treating them at 600°C. in an oxygen atmosphere.

Dark grayish green lead suboxide prepared by Shimazu's method was used as the starting powdery lead suboxide, and as a result of analysis of its composition, it was found that the content of lead oxides, calculated as PbO, was 69.0 % by weight and it containined iron impurities in an amount, calculated as $Fe_2O_3$, of 5 ppm. The bulk of the starting powdery lead suboxide, as measured according to the method described under the item "Bulk", K 5101 of Japanese Industrial Standards, was 0.72 ml/g.

This lead suboxide powder was compressed in the state inserted between two sheets of a rigid vinyl chloride resin, and thus molded into flaky granules having a thickness of about 1.0 to about 0.3 mm. The apparent density of the so formed flaky lead suboxide was about 5.3 g/cc, as measured according to the measurement method described hereinabove.

The flaky granules of lead suboxide were placed for 5 minutes in an electric furnace of 600°C. into which oxygen gas was being introduced. Thus, dark grayish lead suboxide was converted to yellow flaky litharge. At this time, the resulting flaky litharge could be recovered from the furnace while retaining the flaky granular form without powdering thereof.

When this yellow flaky litharge was dissolved in nitric acid in order to know whether unoxidized metallic lead was present or not, the litharge was completely dissolved in nitric acid and a colorless transparent liquor was obtained. Thus, it was confirmed that the content of metallic lead present in the litharge was less than 0.01%, and it could be understood that even when lead suboxide was oxidized in the granular form, the entire of lead suboxide was completely oxidized.

When the iron component contained in the so obtained yellow flaky litharge was analyzed, the content of iron was 7 ppm as calculated as $Fe_2O_3$. Thus, it was found that the iron content was hardly increased during the oxidation operation.

The apparent density of the so formed flaky litharge was found to be about 6.1 g/cc, which was much lower than the true density of litharge (0.53). Thus, it can readily be understood that the litharge retained the granular form in a very bulky state and the granules contained agreat quantity of hollow voids, and hence, the reason why oxidation was advanced uniformly even into the interior of granules can also be understood quite well.

The so formed flaky litharge was compared with commercially available powdery litharge, commercially available granular litharge (formed by tabletting powdery litharge) and massive litharge prepared by subjecting powdery lead suboxide to combustion and oxidation at 600°C. for 4 hours in a rotary furnace while utilizing the conbustion heat and introducing oxygen positively according to the method disclosed in the specification of Japanese Patent Publication No. 11801/62, with respect to the metallic lead content, the iron component content and the apparent density. Results are shown in Table 2.

Table 2

| Litharge | Metallic lead content in litharge (% by weight) | Iron content in litharge (ppm as calculated as $Fe_2O_3$) | Apparent density of granules (g/cc) |
|---|---|---|---|
| Product of Example 1 | below 0.01 | 7 | 6.1 |
| Commercially available powdery litharge | 0.15 | 15 | — |
| Commercially available granular litharge | 0.28 | 18 | 7.8 |
| Massive litharge obtained by method of Japanese Patent Publication No. 11801/62 | 0.35 | 11 | 8.5 |

From the foregoing results, it can readily be understood that when the starting lead suboxide is molded, in advance, into granules, oxidation is advanced very uniformly and litharge of good quality can be obtained very easily without scattering of lead dusts harmful to the human body during the oxidation step and with less incorporation of impurities such as iron from an oxidation apparatus.

EXAMPLE 2

This Example illustrates an embodiment where lead suboxide granules differing in the apparent density from those of Example 1 are oxidized.

The same dark grayish lead suboxide as employed in Example 1 was employed in this Example as the starting powdery lead suboxide.

About 1 Kg of water was added to 10 Kg of the starting lead suboxide, and they were uniformly blended and molded in granules having a diameter of 0.5 to 10 mm, by means of a blender granulator, i. e., a mixing granulator constructed by employing a resinous substance as the main structural material (see "Chemical Engineering", special extra number issued in August, 1968, in Japan, Factory Operation Series, Volume of Granulation, pages 39 and 56 - 57). By this operation of adding water, the blend emitted heat and a part of the starting lead suboxide was oxidized and came to show a brown color.

The apparent density of the so obtained granular, partially oxidized lead suboxide was determined. Since this lead suboxide was in the wet condition, it was once dried at about 120°C. in a drier, and then the measurement of the apparent density was conducted according to the above-mentioned method. As a result, the granules were found to have an apparent density of about 6.2 g/cc.

The wet granules of lead suboxide were thrown at a rate of about 400 g/min into a furnace of the rotary kiln type having an inner diameter of about 300 mm and a length of 2000 mm, the inner wall of which was lined with a refractory brick, and the temperature was elevated with use of a silicon carbide heating element while rotating the furnace. In this manner, the granules were calcined at 450°C. for 30 minutes to obtain granular minium ($Pb_2O_3$) of an orange color.

When the above operation was repeated while elevating the temperature to 600°C. and calcination was carried out for 30 minutes, granular litharge (PbO) of a yellow color was obtained.

With respect to each of the so obtained minimum and litharge, the metallic lead content, the iron content and the apparent density of the resulting granules were determined to obtain results shown in Table 3.

Table 3

|  | Minium ($Pb_3O_4$) | Litharge (PbO) |
|---|---|---|
| Metallic lead content (% by weight) | below 0.01 | below 0.01 |
| Iron content (ppm as calculated as $Fe_2O_3$) | 7 | 7 |
| Apparent density (g/cc) of granules | 5.9 | 6.0 |

From the foregoing results, it can be understood that when the starting lead suboxide is molded in granules by employing water as the granulation medium and then they are oxidized, minium and litharge of good quality can be prepared in a continuous and reasonable manner without scattering of lead dusts harmful to the human body.

EXAMPLE 3

This Example illustrates an embodiment where various media are employed for granulation of the starting starting lead suboxide and the resulting granules are oxidized.

The same dark grayish green lead suboxide as used in Example 1 was employed as the starting powdery lead suboxide.

Fifteen media indicated in Table 4 including acid aqueous solutions, alkali aqueous solutions, salt aqueous solutions and organic solvents were employed as the granulation medium.

The liquid medium was added to the starting powdery lead suboxide in an amount of about 1 Kg per 10 Kg of the starting lead suboxide powder, and with use of a blender granulator as described in Example 2, they were blended uniformly and molded in granules having a diameter of about 1 to about 10 mm.

The resulting granules were thrown in a furnace of the rotary kiln type as described in Example 2, and the calcination was conducted at 600°C. for 30 minutes to obtain granular litharge.

With respect to each of the so prepared litharge products, the metallic lead content and the iron content were determined to obtain results shown in Table 4.

Table 4

| Granulation Liquid Medium | | Apparent density (g/cc) | Metallic lead content in product (% by weight) | Iron content in product (ppm as calculated as $Fe_2O_3$) |
|---|---|---|---|---|
| Kind | Concentration | | | |
| nitric acid | 0.65 N | 4.55 | below 0.01 | 7 |
| hydrochloric acid | 0.5 N | 4.60 | below 0.01 | 6 |
| boric acid | 2 % | 5.30 | below 0.01 | 7 |
| aqueous ammonia | 0.06 N | 4.85 | below 0.01 | 7 |
| caustic soda | 0.5 % | 4.50 | below 0.01 | 7 |
| strontium hydroxide | 2 % | 5.80 | below 0.01 | 7 |
| sodium chloride | 10 % | 5.10 | below 0.01 | 6 |
| ammonium nitrate | 10 % | 5.20 | below 0.01 | 7 |
| ammonium acetate | 1 % | 5.90 | below 0.01 | 7 |
| ethanol | | 5.88 | below 0.01 | 7 |
| benzene | | 6.10 | below 0.01 | 7 |
| kerosine | | 6.20 | below 0.01 | 7 |
| fluid paraffin | | 6.10 | below 0.01 | 7 |
| stearic acid | liquefied by heating | 5.70 | below 0.01 | 7 |
| polyvinyl alcohol | 10 %, liquefied by heating | 6.20 | below 0.01 | 7 |

From the results shown in the above Table, it can readily be understood that good results can be obtained by conducting granulation of the starting lead suboxide with use of any of acid aqueous solutions, salt aqueous solutions and organic solvents as the granulation medium. It can also be understood that nitric acid is used as the granulation medium, when the conversion of lead suboxide to litharge tends to be enhanced.

EXAMPLE 4

This Example illustrates an embodiment where various kinds of oxygen-containing atmospheres are used when granular lead suboxide is oxidized at a prescribed temperature.

Wet granular lead suboxide having an apparent density of 6.2 g/cc when dried, which was prepared by the method described in Example 2, was employed as the granular lead suboxide to be oxidized.

A furance of the rotary kiln type as described in Example 2 was employed as the furnace for calcination of the granular lead suboxide.

An oxygen-containing atmosphere indicated in Table 5 was positively introduced into this rotary furnace at a rate of about 5 liters per minute. The oxidation was carried out at 450°C. for 15, 25 or 35 minutes.

Pure oxygen, steam, a 1 : 1 gaseous mixture of oxygen and air, and air were chosen as the oxygen-containing atmosphere.

Under the above mentioned oxidization conditions, the granular lead suboxide was oxidized, and the oxidizing states were compared based on the metallic content in the resulting litharge to obtain results shown in Table 5.

Table 5

| Kind of oxygen-containing atmosphere | Metallic lead content (% by weight) | | |
|---|---|---|---|
| | 15 minutes' oxidation | 25 minutes' oxidation | 35 minutes' oxidation |
| pure oxygen | 0.05 | below 0.01 | below 0.01 |
| steam | 0.08 | below 0.01 | below 0.01 |
| oxygen-air mixture | 0.85 | 0.32 | below 0.01 |
| air | 1.70 | 0.69 | below 0.01 |

From the foregoing results, it can readily be understood that oxidation of granular lead suboxide is effectively advanced by introducing positively an oxygen-containing gas into the rotary furnace used for calcination of the granular lead suboxide.

EXAMPLE 5

This Example illustrates another embodiment of granulation of lead suboxide.

The same dark grayish lead suboxide as employed in Example 1 was used as the starting powdery lead suboxide.

Four kinds of granules of lead suboxide differing in the particle size or the particle configuration were molded by adopting any of (A) a method comprising molding the starting powdery lead suboxide containing water into columns having a diameter of 1.5 mm or 5 mm by employing a screw extruder, which is included in the extrusion molding machine, (B) a method comprising molding the starting powdery lead suboxide containing color into spherical granules having a particle diameter of 2 to 0.5 mm by using a drum granulator, which is included in the rotary molding machine, and (C) a method comprising molding the starting powdery lead suboxide containing water into tablets having a particle size of about 7 mm by employing a tablet machine, which is included in the compression molding machine.

The so obtained 4 kinds of granules of lead suboxide were oxidized under the calcination conditions of 450°C. and 35 minutes by employing a furnace of the rotary kiln type as described in Example 2 to obtain litharge products having the configuration and size corresponding to those of the starting lead suboxide granules.

In order to compare the oxidation state in each of the so obtained litharge products, the metallic lead content was determined with respect to each litharge product to obtain results shown in Table 6.

Table 6

| Granulation method | Metallic lead content in litharge product (% by weight) |
|---|---|
| extrusion molding method (A) (1.5 mm diameter) | below 0.01 |
| extrusion molding method (A) (5 mm diameter) | below 0.01 |
| rotary molding method (B) (2 – 0.5 mm diameter) | below 0.01 |
| compression molding method (C) (about 7 mm diameter) | below 0.01 |

From the foregoing results, it can be seen that when lead suboxide is molded into granules by various molding procedures, in each case granules capable of giving litharge of good quality can be obtained.

It was confirmed that in case the granulation was carried out by employing a screw extruder, the oxidation was advanced more promptly and completed in a shorter time in granules having a diameter of 1.5 mm than in granules having a diameter of 5 mm.

EXAMPLE 6 450°

This Example illustrates an embodiment where lead suboxide is oxidized while granulating it.

The same dark grayish green lead suboxide as employed in Example 1 was used as the starting lead suboxide powder.

A method generally known as the fluidized drying method was adopted as the method for oxidizing the starting lead suboxide while granulating it.

More specifically, a stainless steel net was placed in the lower portion (50 mm from the bottom) of a quartz glass tube (30 mm in diameter and 500 mm in length) and lead oxide granules acting as nuclei (prepared by the method described in Example 2 and classified by sieving to have a size of 0.5 – 1.5 mm) were placed on the net in a height of about 20 mm (corresponding to about 40 g). Hot air (having heat energy sufficient to maintain the fluidized layer at 450° – 500°C.) was projected from below the net to form a fluidized layer on the net in a height of about 50 to about 60 mm. A kneaded mixture obtained by incorporating the powdery lead suboxide with about 15% of water was added little by little into the so formed fluidized layer in an amount approximating the amount of the lead oxide previously charged to form nuclei (about 40 g). When the kneaded mixture of the lead suboxide and water was added to the fluidized layer, it was molded into granules while the nuclei previously charged grew, and these granules were included in the fluidized layer. As a result, the height of the fluidized layer reached 80 – 90 mm. The rate of the hot air was so adjusted that the temperature of the fluidized layer was maintained at 450°-500°C. After addition of about 40 g of the lead suboxide kneaded with water had been completed, the fluidized calcination was further continued for 10 minutes at 450° – 500°C.

The metallic lead content in the resulting granular lead oxide of a reddish brown color was measured to be less than 0.01% by weight.

From the foregoing results, it can readily be understood that a lead oxide product of good quality can be obtained without scattering lead powder dusts also by conducting the oxidation while molding the starting lead suboxide into granules in the fluidized layer.

EXAMPLE 7

This Example illustrates an embodiment of preparing a lead bearing additive of the brickette form.

The same dark grayish green lead suboxide as employed in Example 1 was used as the starting powdery lead suboxide.

Silica powder for crystal glass having the following chemical composition and size distribution was employed as the starting silicon dioxide component.

| Chemical Composition | |
|---|---|
| $SiO_2$ | 99.9 % |
| $K_2O$ | 0.002 % |
| $Na_2O$ | 0.013 % |
| $CaO$ | 0.003 % |
| $TiO_3$ | 0.001 % |
| $Al_2O_3$ | 0.02 % |
| $Fe_2O_3$ | 0.002 % |
| Size Distribution | |
| Greater than 100 mesh | 2 % |
| 100 – 200 mesh | 66 % |
| smaller than 200 mesh | 32 % |

Both starting materials were intimately mixed by the dry blending method in a mixer having a lining free of iron and chromium, the amounts of both starting materials being so adjusted that the weight ratio expressed as $PbO : SiO_2$ was 85 : 15.

10 parts by weight of water per 100 parts by weight of the mixture was contacted in the droplet state uniformly with the above mixture, and the resulting mixture was charged into a blender granulator as described in Example 2 and molded into water-containing granules having a diameter of about 7 to about 0.5 mm.

The resulting water-containing granules were dried at about 100°C. and calcined at 650°C for 10 minutes to obtain granular brickettes having a yellow color and a diameter of 7 to 0.1 mm.

As regards the so obtained granular brickettes, the chemical composition, the X-ray diffraction pattern (PC-method using an X-ray diffractometer of model DF-2 manufactured by Rigaku Denki), the amount (%) of generated fume, nitric acid (1.34 N) reactivity RN (%), the metallic lead content (%), the apparent density D (g/cc), the hue and the uniformity were determined to obtaine results shown in Table 7.

The uniformity was tested on the brickettes obtained in this Example and vetrified cullets (B) in the following manner. The sample was divided into three groups based on particle size (group of 7 – 3 mm, group of 3 – 0.2 mm and group of less than 0.2 mm), and the chemical analysis was conducted on each group.

Also with respect to (A) a homogeneous mixture obtained by blending the starting lead suboxide without addition of water, (B) vetrified lead silicate cullets obtained by charging the brickettes obtained in this Example in an alumina crucible, melting them at 950°C., throwing the melt into water and thereby quenching it, and (C) commercially available fine powder of lead silicate (manufactured by Eagle Pitcher) in which the PbO : SiO₂ weight ratio is 85 : 15, the foregoing properties were similarly determined. Results are shown in Table 7.

Lead bearing additives of the brickette form were prepared in the same manner as in Example 7 except that the mixing ratio of the starting powdery lead suboxide and silica powder was changed as shown in Table 8.

With respect to each of the so obtained lead bearing

Table 7

|  | Brickettes of Example 7 | Powder of mixture of lead suboxide and silicon dioxide (A) | Molten and water-granulated cullets (B) | Commercially available lead silicate powder (C) |
|---|---|---|---|---|
| Chemical composition (%) |  |  |  |  |
| PbO | 85.0 | 85.0 | 84.8 | 84.5 |
| $SiO_2$ | 15.0 | 15.0 | 15.1 | 15.4 |
| $Al_2O_3$ | 0.02 | 0.02 | 0.05 | 0.1 |
| $Fe_2O_3$ | 0.002 | 0.002 | 0.004 | 0.05 |
| X-ray diffraction pattern | $PbSiO_3$ | $PbO + SiO_2$ | amorphous | amorphous |
| Amount of fume generated (%) |  |  |  |  |
| 1050°C. | 0.48 | 1.50 | 0.49 | 0.63 |
| 1400°C. | 1.41 | 4.20 | 1.42 | 1.48 |
| Nitric acid reactivity RN (%) | 95.4 | 98.5 | 9.2 | 2.7 |
| Metallic lead content (%) | below 0.01 | below 0.01 | below 0.01 | below 0.01 |
| Apparent density D (g/cc) | 5.1 |  | 5.5 |  |
| Hue | light frick | brown | yellow | white |
| Uniformity (PbO content, %) |  |  |  |  |
| 7 – 3 mm | 85.0 |  | 79.4 |  |
| 3 – 0.2 mm | 85.0 |  | 83.2 |  |
| less than 0.2 mm | 85.0 |  | 93.7 |  |

From the foregoing results, it can readily be understood that in the granular brickettes of this invention lead silicate is formed only by conducting calcination without performing melting and water granulation operations requiring a high technical level and great expenses, which are indispensable for preparing conventional cullet products, and that according to this invention lead bearing additives for ceramic use having a high purity and excellent in uniformity can be easily prepared without using a special melting furnace or the like with less generation of lead fumes.

When a raw material for crystal glass was prepared with use of the lead bearing additive of the brickette form obtained in this Example, scattering was extremely scarce at the mixing step as compared with the case of litharge and handling of the lead bearing additive was very easy, and the resulting raw material for crystal glass was similar to that obtained with use of litharge. Moreover, it was confirmed based on the results of measurement of the specific gravity of the final crystal glass product that the amount of the lead component fixed to the crystal glass product obtained with use of the lead bearing additive of this Example was greater than the amount of the fixed lead component in the crystal glass product obtained with use of litharge.

EXAMPLE 8

This Example illustrates an embodiment where lead bearing additives of the brickette form are prepared by employing various starting mixtures differing in the PbO : SiO₂ mixing ratio.

additives, the X-ray diffraction pattern, the amount of fume generated, the nitric acid reactivity RN, the metallic lead content, the apparent density D and the hue were determined in the same manner as in Example 7 to obtain results shown in Table 8.

Table 8

| Mixing Ratio (%) |  |  |  |  |  |
|---|---|---|---|---|---|
| PbO | 93 | 75 | 65 | 50 | 30 |
| $SiO_2$ | 7 | 25 | 35 | 50 | 70 |
| X-ray diffraction pattern | $PbSiO_3$ | $PbSiO_3$ | $PbSiO_3$ | $PbSiO_3$ | $PbSiO_3$ |
| Amount (%) of fume generated at 1400°C. | 1.58 | 1.27 | 1.25 | 0.82 | 0.12 |
| Nitric acid reactivity RN (%) | 95.5 | 87.7 | 76.2 | 58.1 | 42.4 |
| Metallic lead content (%) | below 0.01 | below 0.01 | below 0.01 | below 0.01 | below 0.01 |
| Hue | reddish brown | light brick | yellowish white | white | white |

From the foregoing results, it can readily be understood that when lead bearing additives of the brickette form are prepared by varying the PbO : SiO₂ mixing ratio from 93 : 7 to 30 : 70, in each case a good lead bearing additive for ceramic use characterized by less generation of lead fumes can be obtained.

EXAMPLE 9

This Example illustrates an embodiment where in preparing lead bearing additives of the brickette form, various temperatures are adopted for the heat treatment to know the influences of the heat treatment temperature.

Water-containing granules of a diameter of 7 – 0.1 mm prepared in the same manner as described in Example 7 by adjusting the PbO : SiO₂ weight ratio to 65 : 35, and they were treated at room temperature (25°C) for 60 minutes or at 115°, 200°, 600° or 700°C, for 10 minutes to obtain lead bearing additives of the granular brickette form.

With respect to each of the so formed lead bearing additives of the brickette form, the X-ray diffraction pattern (see FIG. 1), the amount of fume generated, the nitric acid reactivity RN, the apparent density D and the hue were determined to obtain results shown in Table 9.

Table 9

| Treatment temperature (°C.) | untreated | room temperature | 115 | 200 | 600 | 700 |
|---|---|---|---|---|---|---|
| X-ray diffraction pattern | | (see FIG. 1) | | | | |
| Amount of fume generated at 1400°C. (%) | 4.20 | 1.40 | 1.35 | 1.30 | 1.25 | 1.25 |
| Nitric acid reactivity RN (%) | 98.5 | 90.7 | 87.6 | 84.2 | 74.7 | 75.0 |
| Apparent density D (g/cc) | — | 3.3 | 3.5 | 3.8 | 4.9 | 5.2 |
| Hue | brown | light brown | light yellow | light yellow | yellowish white | white |

From the foregoing results, it can readily be understood that when lead bearing additives of the brickette form are prepared by adopting various temperatures at the heat treatment of the granules, it is possible to obtain products of good quality useful as lead bearing additives for ceramic use while maintaining the generation of lead fumes at an extremely low level.

EXAMPLE 10

This Example illustrates an embodiment where lead bearing additives of the granular brickette form are prepared by employing litharge and trilead tetroxide as the starting lead oxide.

As the starting litharge was employed a litharge product of grade 1 specified in K-1456 of Japanese Industrial Standard, namely litharge having the following composition:

| PbO | 99.8 % |
| Fe | 0.0004 % |
| Cu | 0.0001 % |
| acid-insoluble components | 0.1 % |
| weight loss on drying | 0.1 % |

As the product of trilead tetroxide was used commercially available red lead glasses, $3O_4$) of grade 1 specified in K-1457 of Japanese Industrial Standards, namely red lead having the following composition: end

| $Pb_3O_4$ | 99.8 % |
| Fe | 0.0004 % |
| Cu | 0.0001 % |
| components insoluble in nitric acid-hydrogen peroxide | 0.1 % |
| weight loss on drying | 0.1 % |

The same silica powder as employed in Example 7 was used as the starting silica component.

In the case of either litharge or trilead tetroxide, the mixing ratio of the lead oxide component and silica component, expressed as $PbO : SiO_2$, was adjusted to 85 : 15.

In the same manner as described in Example 7, each of mixtures of the lead oxide and silica components was molded in water-containing granules of a diameter of about 7 to about 0.1 mm by means of a blender granulator as described in Example 2. The granules were dried at about 100°C. and calcined at 650°C. for 10 minutes to obtain white granular brickettes.

With respect to each of the so obtained lead bearing additives of the granular brickette form, the X-ray diffraction pattern, the amount of fume generated, the nitric acid reactivity RN, the apparent density D and the hue were determined to obtain results shown in Table 10.

Table 10

| Starting lead oxide | Litharge | Trilead tetroxide |
|---|---|---|
| X-ray diffraction pattern | $PbSiO_3$ | $PbSiO_3$ |
| Amount (%) of fume generated at 1400°C. | 1.24 | 1.25 |
| Nitric acid reactivity RN (%) | 76.0 | 76.3 |
| Apparent density D (g/cc) | 5.1 | 5.0 |
| Hue | light brick | light brick |

From the foregoing results, it can readily be understood that even when litharge is used as the starting lead oxide, if its granular mixture with silica is heat-treated at 650°C., the reaction between litharge and silica is caused to proceed simultaneously with the oxidation of litharge, whereby a lead bearing additive of the brickette form for ceramic use having good quality can be obtained. It can also be understood that when red lead is used as the starting lead oxide component, a lead bearing additive of the brickette form for ceramic use can easily be prepared while maintaining the generation of lead fumes at a very low level.

EXAMPLE 11

This Example illustrates an embodiment of preparing lead bearing additives by employing as the starting silicon dioxide component silica powder or silica gel powder in the absence of a granulation medium.

Silica powder prepared by pulverizing silica produced in Korea and having the composition and particle size distribution shown in Table 11 was used as the starting silica powder.

Silica gel powder formed by neutralizing sodium silicate with sulfuric acid to form silica hydrogel, washing it sufficiently and drying and pulverizing it, and having the composition and particle size distribution as shown in Table 11, was used as the starting silica gel powder.

The same lead suboxide as employed in Example 1 was used as the starting lead oxide component.

Both the lead oxide component and the silica component were mixed together by the dry blending method in such amounts that the mixing weight ratio of both the components, expressed as $PbO : SiO_2$, was 85 : 15. without addition of water, the mixture was inserted between two rigid vinyl chloride resin sheets and compression-molded into flaky granules having a thickness of 1.0 to 0.3 mm, and the flaky granules were calcined at 650°C. for 10 minutes to obtain a lead bearing additive of the brickette form.

With respect to each of the so formed lead bearing additives of the brickette form, the X-ray diffraction pattern, the amount of fume generated, the nitric acid reactivity RN and the apparent density D were determined to obtain results shown in Table 11.

Table 11

| Starting silicon dioxide | Silica Powder | Silica gel powder |
|---|---|---|
| Composition (%) | | |
| $SiO_2$ | 99.9 | 99.9 |
| $K_2O$ | 0.003 | 0.001 |
| $Na_2O$ | 0.015 | 0.1 |
| CaO | 0.007 | 0.000 |
| $TiO_2$ | 0.001 | 0.000 |
| $Al_2O_3$ | 0.02 | 0.005 |
| $Fe_2O_3$ | 0.003 | 0.002 |
| Particle Size Distribution (%) | | |
| Greater than 100 mesh | 2 | 0 |
| 100 to 200 mesh | 18 | 0 |
| smaller than 200 mesh | 80 | 100 |
| X-ray diffraction pattern | $PbSiO_3$ | $PbSiO_3$ |
| Amount (%) of fume generated at 1400°C. | 1.40 | 1.41 |
| Nitric acid reactivity RN (%) | 93.7 | 90.5 |
| Apparent density D (g/cc) | 5.1 | 5.2 |

From the foregoing results, it can readily be understood that whether silica powder or silica gel powder is used as the silicon dioxide component, even if water is not specially added at the time of molding a mixture of such silicon dioxide component with the lead oxide component into granules, it is possible to obtain a high quality lead bearing additive of the granular brickette form.

EXAMPLE 12

This Example illustrates an embodiment where lead bearing additives of the brickette form are prepared by employing liquid media other than water as the granulation medium to be added when a mixture of the starting lead oxide component and silicon dioxide component is molded into granules.

A mixture in which the weight ratio of $PbO : SiO_2$ was 85 : 15 and which was prepared by the method described in Example 7, as employed as the mixture of the starting lead oxide and silica powder to be molded into granules.

Fifteen liquid media illustrated in Table 12 were chosen as the granulation medium from acid aqueous solutions, alkali aqueous solutions, salt aqueous solutions and organic solvents. The liquid medium was incorporated uniformly in the starting mixture in an amount of about 10 % based on the starting mixture, and the resulting aqueous mixture was molded into granules of a diameter of 7 to 0.1 mm according to the method described in Example 7. The resulting granules were calcined at 650°C. for 20 minutes to obtain a lead bearing additive of the brickette form.

With respect to each of the so obtained lead bearing additives, the X-ray diffraction pattern, the amount of fume generated, the nitric acid reactivity RN and the apparent density D were determined to obtain results shown in Table 12.

Table 12

| Liquid medium | | X-ray diffraction pattern | Amount of fume generated (1400°C.) (%) | Nitric acid reactivity RN (%) | Apparent density D (g/cc) |
|---|---|---|---|---|---|
| Kind | Concentration | | | | |
| nitric acid | 0.65 N | $PbSiO_3$ | 1.40 | 95.0 | 5.0 |
| hydrochloric acid | 0.5 N | $PbSiO_3$ | 1.43 | 95.2 | 5.1 |
| boric acid | 2 % | $PbSiO_3$ | 1.42 | 93.4 | 5.0 |
| aqueous ammonia | 0.06 N | $PbSiO_3$ | 1.43 | 92.7 | 5.0 |
| caustic soda | 0.5 % | $PbSiO_3$ | 1.32 | 91.8 | 5.3 |
| strontium hydroxide | 1 % | $PbSiO_3$ | 1.42 | 93.0 | 5.0 |
| sodium chloride | 10 % | $PbSiO_3$ | 1.40 | 92.4 | 5.1 |
| ammonium nitrate | 10 % | $PbSiO_3$ | 1.42 | 93.0 | 5.0 |
| ammonium acetate | 10 % | $PbSiO_3$ | 1.43 | 93.5 | 5.0 |
| ethanol | | $PbSiO_3$ | 1.43 | 95.0 | 5.1 |
| kerosine | | $PbSiO_3$ | 1.43 | 95.0 | 5.1 |
| fluid paraffin | | $PbSiO_3$ | 1.43 | 95.0 | 5.1 |
| stearic acid | liquefied by heating | $PbSiO_3$ | 1.43 | 95.2 | 5.0 |
| polyvinyl alcohol | 10 %, liquefied by heating | $PbSiO_3$ | 1.43 | 95.0 | 5.0 |

From the foregoing results, it can readily be understood that when granules are prepared by employing various liquid media other than water and they are calcined, high quality lead bearing additives of the granular brickette form for ceramic use can be obtained.

EXAMPLE 13

This Example illustrates an embodiment where lead bearing additives of the granular brickette form are prepared by incorporating various additives to a mixture of the starting lead oxide and silica powder.

A dry-blended mixture in which the $PbO : SiO_2$ weight ratio was 85 : 15 and which was obtained by the method described in Example 7 was used as the starting mixture.

The following 21 additives were used; namely sodium silicate solution (formed by diluting commercially available sodium silicate of grade 2 specified by Japanese Industrial Standards with water so as to attain a concentration of 10 % calculated as SiO$_2$), sodium aluminate solution (formed by diluting commercially available reagent of sodium aluminate with water so as to attain a concentration of about 10 % calculated as Al$_2$O$_3$), aluminum hydroxide (Al$_2$O$_3$ content of 68 %), alumina gel powder (commercially available product), borax (commercially available reagent), boric acid (commercially available reagent), potassium nitrate (commercially available reagent), disodium hydrogen-phosphate (commercially available reagent), sodium carbonate (commercially available reagent), potassium carbonate (commercially available reagent), magnesium carbonate (commercially available reagent), strontium carbonate (commercially available reagent), barium hydroxide (commercially available reagent), titanium oxide (commercially available reagent), zirconium oxide (commercially available reagent), antimony oxide (commercially available reagent), cerium oxide (commercially available reagent), barium selenate (commercially available reagent) and tin oxide (commercially available reagent).

Such additive was added to a mixture of litharge and silica powder in an amount indicated in Table 13 per 100 g of the mixture. In the case of additives other that sodium silicate solution and sodium aluminate solution, in the same manner as described in Example 7, water was added in the form of mists or droplets in an amount of about 10 % uniformly to the above mixture, and it was molded into granules having a diameter of 7 – 0.1 mm. In the case of sodium slicate solution and sodium aluminate solution, water was not used and the granulation was conducted by using 10 cc of such solution instead of water.

The so formed granules were dried and calcined at 650°C. for 10 minutes to obtain an additive-incorporated, lead bearing additive of the brickette form.

With respect to each of the so formed lead bearing additives, the X-ray diffraction pattern, the amount of fume generated, the nitric acid reactiviey and the apparent density were determined to obtain results shown in Table 13.

the starting mixture of the lead oxide component and silica component, high quality lead bearing additives of the brickette form for use in ceramic industry can be prepared by simple procedures. It can also be understood that in these lead bearing additives of the brickette form, such third component additive as mentioned above is uniformly dispersed and fixed and they can be applied conveniently to intended uses in a direct or indirect manner.

What we claim is:

1. A solid lead-bearing additive for use in the ceramic industry which consists essentially of brickettes obtained by calcining the granular mixture of a lead oxide and silicon dioxide, wherein the weight ratio of the lead oxide calculated as PbO and silicon dioxide calculated as SiO$_2$ is within the following range:

$$PbO : SiO_2 = 93 : 7 \sim 30 : 70,$$

said brickettes having the particle size of from 0.1 to 10 mm, said brickettes having an apparent density expressed by the following formula:

$$D = Kd(Xd_x + Yd_y)$$

wherein $D$ is an apparent density in g/cc of the brickettes, $d_x$ represents a true density of the lead oxide component, $X$ represents the weight ratio of the lead oxide component contained in the brickettes, $d_y$ represents a true density of silicon dioxide, $Y$ represents the weight ratio of silicon dioxide contained in the brickettes, and $Kd$ is a number from 0.2 to 0.85 and having a nitric acid reactivity (RN) of 10 to 96.5%, where RN is defined by the formula $$RN = \frac{X_1}{X_o} \times 100$$

wherein $X_0$ is the weight in grams of the lead oxide contained in 5 g of the brickettes, and $X_1$ is the weight in grams of the lead oxide which is dissolved when 5 g of the brickettes are agitated for 20 minutes in 50 ml. of Table 13

| Liquid medium | | X-ray diffraction pattern | Amount of fume generated (1400°C.) (%) | Nitric acid reactivity RN (%) | Apparent density D (g/cc) |
|---|---|---|---|---|---|
| Kind | Concentration | | | | |
| sodium silicate solution | 10 ml | PbSiO$_3$ | 1.38 | 91.5 | 5.2 |
| sodium aluminate solution | 10 ml | PbSiO$_3$ | 1.39 | 92.7 | 5.1 |
| aluminum hydroxide | 2 g | PbSiO$_3$ | 1.40 | 94.3 | 5.0 |
| alumina gel powder | 15 g | PbSiO$_3$ | 1.36 | 88.6 | 4.8 |
| borax | 5 g | PbSiO$_3$ | 1.42 | 94.5 | 5.0 |
| boric acid | 5 g | PbSiO$_3$ | 1.40 | 94.5 | 5.0 |
| potassium nitrate | 2 g | PbSiO$_3$ | 1.39 | 94.2 | 5.0 |
| disodium hydrogen-phosphate | 2 g | PbSiO$_3$ | 1.43 | 94.7 | 5.1 |
| sodium sulfate | 2 g | PbSiO$_3$ | 1.43 | 95.0 | 5.1 |
| sodium carbonate | 2 g | PbSiO$_3$ | 1.43 | 95.0 | 5.0 |
| magnesium carbonate | 2 g | PbSiO$_3$ | 1.43 | 95.0 | 5.0 |
| strontium carbonate | 2 g | PbSiO$_3$ | 1.43 | 95.0 | 5.0 |
| barium hydroxide | 2 g | PbSiO$_3$ | 1.42 | 95.0 | 5.0 |
| titanium oxide | 2 g | PbSiO$_3$ | 1.43 | 95.0 | 5.0 |
| arsenious acid | 2 g | PbSiO$_3$ | 1.43 | 95.0 | 5.0 |
| zirconium oxide | 2 g | PbSiO$_3$ | 1.43 | 95.0 | 5.0 |
| antimony oxide | 2 g | PbSiO$_3$ | 1.43 | 95.0 | 5.0 |
| cerium oxide | 2 g | PbSiO$_3$ | 1.43 | 95.0 | 5.0 |
| barium selenate | 2 g | PbSiO$_3$ | 1.43 | 95.0 | 5.0 |
| tin oxide | 2 g | PbSiO$_3$ | 1.43 | 95.0 | 5.0 |

From the foregoing results, it can readily be understood that when various additives are incorporated in 1.34 N nitric acid.

2. The solid lead-bearing additive of claim 1 wherein said brickettes contain at last 0.01% by weight, based on the total weight of the brickettes, of boric compound selected from the group consisting of borax and boric acid.

3. The solid lead-bearing additive of claim 1 wherein said brickettes contain at least 0.01% by weight, based on the total weight of the brickettes, of aluminum compound selected from the group consisting of aluminum oxide and hydroxide and aluminates.

4. The solid lead-bearing additive of claim 1 wherein said brickettes contain at least 0.01% by weight, based on the total weight of the brickettes, of alkaline earth metal compound selected from the group consisting of the alkali and alkaline earth metal oxides, hydroxides, carbonates, nitrates and sulfates and halides.

5. The solid lead-bearing additive of claim 1 wherein said brickettes contain at least 0.01% by weight, based on the total weight of the brickettes, of a coloring agent and said halide of alkali metal.

6. A process for the manufacture of lead-bearing additives for use in ceramic industry which comprises intimately mixing lead suboxide having a composition expressed by the following formula:

$$PbO_x$$

wherein x is a number from 0.4 to 0.9,
with silicon dioxide or a silicate so that the mixing weight ratio of the lead suboxide calculated as PbO and the silicon dioxide or silicate calculated as $SiO_2$ is within the following range:

$$PbO : SiO_2 = \text{from } 93 : 7 \text{ to } 30 : 70,$$

molding the resulting mixture into granules having a particle size of from 0.1 to 10 mm and having an apparent density expressed by the following formula:

$$D = K(Xd_x + Yd_y)$$

wherein $D$ is an apparent density in g/cc of the granulated product, $d_x$ represents a true density of lead suboxide, $X$ stands for the weight ratio of lead suboxide in the granulated product, $d_y$ represents a true density of silicon dioxide or silicate, $Y$ represents the weight ratio of said silicon dioxide or silicate in the granulated product, and $K$ is a number from 0.2 to 0.85,
and heating the granules at a temperature of 350° to 700°C. in an oxygen-containing atmosphere so as to form the granules into brickettes.

7. A process according to claim 6 wherein the powdery lead suboxide and the silicon dioxide or silicate are mixed in the presence of an aqueous medium.

8. A process for the manufacture of lead-bearing additives for use in the ceramic industry which comprises intimately mixing (a) a powder of a lead oxide selected from the group consisting of litharge and red lead with (b) a siliciferous component selected from the group consisting of silicon dioxide and silicates so that the mixing weight ratio of the lead oxide calculated as PbO and the siliciferous component calculated as $SiO_2$ is within the following range:

$$PbO : SiO_2 = \text{from } 93 : 7 \text{ to } 30 : 70,$$

molding the resulting mixture into granules having a particle size from 0.1 to 10 mm and having an apparent density expressed by the following formula:

$$D = K(Xd_x + Yd_y)$$

wherein $D$ is an apparent density in g/cc of the granulated product, $d_x$ represents the true density of the lead oxide, $X$ represents the weight ratio of the lead oxide in the granular product, $d_y$ represents a true density of the siliciferous component, $Y$ represents the weight ratio of the siliciferous component in the granulated product, and $K$ is a number from 0.2 to 0.85,
and heat-treating the granules at a temperature of at least 200°C. so as to form the granules into brickettes.

9. A process according to claim 8 wherein the lead oxide and siliciferous component are mixed in the presence of an aqueous medium.

* * * * *

UNITED STATES PATENT AND TRADEMARK OFFICE
CERTIFICATE OF CORRECTION

PATENT NO. : 3,956,004
DATED : May 11, 1976
INVENTOR(S) : Yujiro Sugahara et al

It is certified that error appears in the above-identified patent and that said Letters Patent are hereby corrected as shown below:

Claim 2, line 2, delete "last", insert -- least --

Signed and Sealed this

Twentieth Day of July 1976

[SEAL]

Attest:

RUTH C. MASON
Attesting Officer

C. MARSHALL DANN
Commissioner of Patents and Trademarks